US011943389B2

(12) United States Patent
Willshire

(10) Patent No.: US 11,943,389 B2
(45) Date of Patent: *Mar. 26, 2024

(54) SYSTEM AND METHODS FOR AUTOMATED CUSTOMER RESPONSE SYSTEM MAPPING AND DUPLICATION

(71) Applicant: Cyara Solutions Pty Ltd, Hawthorn (AU)

(72) Inventor: Geoff Willshire, Greenslopes (AU)

(73) Assignee: Cyara Solutions Pty Ltd, Hawthorn (AU)

(*) Notice: Subject to any disclaimer, the term of this patent is extended or adjusted under 35 U.S.C. 154(b) by 41 days.

This patent is subject to a terminal disclaimer.

(21) Appl. No.: 17/863,360

(22) Filed: Jul. 12, 2022

(65) Prior Publication Data
US 2023/0026071 A1 Jan. 26, 2023

Related U.S. Application Data

(63) Continuation of application No. 16/985,652, filed on Aug. 5, 2020, now Pat. No. 11,489,962, which is a (Continued)

(51) Int. Cl.
H04M 3/493 (2006.01)
G10L 15/22 (2006.01)
(Continued)

(52) U.S. Cl.
CPC ............ H04M 3/493 (2013.01); G10L 15/22 (2013.01); H04M 3/24 (2013.01); H04M 3/4938 (2013.01); H04M 7/1295 (2013.01)

(58) Field of Classification Search
CPC ...... G06Q 10/06; G06Q 10/063; G06Q 30/01; G06Q 30/016; G06Q 40/08; G06Q 50/12;
(Continued)

(56) References Cited

U.S. PATENT DOCUMENTS 6,317,492 B1 * 11/2001 Johnson ................ H04M 3/493
379/201.04
6,823,054 B1 * 11/2004 Suhm ..................... H04M 3/36
379/112.01
(Continued)

Primary Examiner — Gerald Gauthier
(74) Attorney, Agent, or Firm — Boon Intellectual Property Law, PLLC; Brian S. Boon

(57) ABSTRACT

A system and method for automated customer response system mapping and duplication to provide for a common Interactive Voice Response ("IVR") system import language or structure, comprising a contact center crawler which connects with an existing automated contact center system, may navigate and map that system by recording and selecting each available option or by interfacing with the code that makes up the IVR itself to generate a model, records the response to each selected option, and feeds the options and responses to a tree creator; a CX model generator which organizes the options and responses into a data map such as a tree or more graph-like or map-like structure, where logical conditions or operations such as loops and recursion may be present; and a coding engine that generates programmatic code representing the data model that is imported into another IVR platform for execution.

8 Claims, 9 Drawing Sheets

Related U.S. Application Data continuation-in-part of application No. 16/379,084, filed on Apr. 9, 2019, now abandoned, which is a continuation of application No. 15/091,556, filed on Apr. 5, 2016, now Pat. No. 10,291,776, which is a continuation-in-part of application No. 14/590,972, filed on Jan. 6, 2015, now Pat. No. 10,091,356.

(51) Int. Cl.
  *H04M 3/24* (2006.01)
  *H04M 7/12* (2006.01)

(58) Field of Classification Search
  CPC ......... G10L 15/22; G10L 15/26; G10L 15/00;
    G10L 15/063; G10L 15/1822; H04M
    1/72436; H04M 3/24; H04M 3/36; H04M
    3/42144; H04M 3/493; H04M 3/4936;
    H04M 3/4938; H04M 3/5166; H04M
    3/5175; H04M 3/5232; H04M 7/1295;
    H04M 3/5183; G06F 3/038; G06F
    16/90332; G06F 16/9038
  See application file for complete search history.

(56) References Cited

U.S. PATENT DOCUMENTS

| | | | |
|---|---|---|---|
| 6,876,727 B2 | 4/2005 | Reynolds | |
| 7,206,744 B2 | 4/2007 | Suryanaraya | |
| 7,249,321 B2* | 7/2007 | Bushey | G06Q 10/06 715/744 |
| 7,287,248 B1 | 10/2007 | Adeeb | |
| 7,373,300 B1 | 5/2008 | Bangalore et al. | |
| 7,415,537 B1 | 8/2008 | Maes | |
| 7,657,828 B2 | 2/2010 | Lucas et al. | |
| 7,734,470 B2 | 6/2010 | Natesan | |
| 7,908,143 B2* | 3/2011 | Kankar | H04M 3/493 704/275 |
| 7,924,986 B2 | 4/2011 | Sadowski et al. | |
| 8,009,811 B2 | 8/2011 | Sharma | |
| 8,046,220 B2 | 10/2011 | Agarwal et al. | |
| 8,160,209 B2 | 4/2012 | Wang et al. | |
| 8,229,081 B2 | 7/2012 | Agapi et al. | |
| 8,301,757 B2 | 10/2012 | Catlin et al. | |
| 8,369,509 B2 | 2/2013 | Jennings | |
| 8,423,635 B2 | 4/2013 | Catlin et al. | |
| 8,468,102 B2 | 6/2013 | Gartner et al. | |
| 8,488,771 B2 | 7/2013 | Blanchard et al. | |
| 8,515,028 B2 | 8/2013 | Berger et al. | |
| 8,565,388 B2 | 10/2013 | Mittal | |
| 8,635,074 B2 | 1/2014 | Collins | |
| 8,654,933 B2* | 2/2014 | Doulton | H04M 3/5183 704/215 |
| 8,654,963 B2 | 2/2014 | Anisimov et al. | |
| 8,666,040 B2 | 3/2014 | Dhanakshirur | |
| 8,682,669 B2* | 3/2014 | Suendermann | G10L 15/063 704/275 |
| 8,706,719 B1 | 4/2014 | Sanz-Pastor et al. | |
| 8,725,513 B2* | 5/2014 | Cross, Jr. | G10L 15/22 715/728 |
| 8,767,948 B1 | 7/2014 | Riahi et al. | |
| 8,855,615 B2 | 10/2014 | Jaiswal et al. | |
| 8,874,636 B2 | 10/2014 | Tuchman et al. | |
| 8,958,532 B2* | 2/2015 | Kritt | H04M 3/493 379/88.01 |
| 8,976,944 B2* | 3/2015 | Doulton | H04M 3/4936 379/88.01 |
| 9,009,041 B2* | 4/2015 | Zavaliagkos | G10L 15/26 704/238 |
| 9,015,046 B2* | 4/2015 | Pereg | G06Q 10/063 379/265.06 |
| 9,100,478 B1 | 8/2015 | Benway et al. | |
| 9,100,481 B2 | 8/2015 | O'Connor et al. | |
| 9,241,012 B2 | 1/2016 | de Castro et al. | |
| 9,398,155 B2 | 7/2016 | Brimshan et al. | |
| 9,634,855 B2 | 4/2017 | Poltorak | |
| 9,680,994 B2 | 6/2017 | Mittal | |
| 9,883,026 B2 | 1/2018 | Aldecoa et al. | |
| 9,900,438 B1 | 2/2018 | Hollenberg et al. | |
| 9,916,128 B2 | 3/2018 | Badger et al. | |
| 10,091,356 B2 | 10/2018 | Kulkarni et al. | |
| 10,115,163 B2 | 10/2018 | Bailey et al. | |
| 10,171,655 B2* | 1/2019 | Anisimov | G06Q 30/016 |
| 10,171,660 B2 | 1/2019 | Dahan | |
| 10,291,776 B2 | 5/2019 | Kulkarni et al. | |
| 10,419,610 B2 | 9/2019 | Dahan et al. | |
| 10,492,102 B2 | 11/2019 | Raleigh et al. | |
| 10,631,257 B1 | 4/2020 | Serero et al. | |
| 11,489,962 B2* | 11/2022 | Willshire | H04M 7/1295 |
| 2003/0115066 A1 | 6/2003 | Seeley et al. | |
| 2003/0121002 A1 | 6/2003 | Goose et al. | |
| 2003/0187656 A1 | 10/2003 | Goose et al. | |
| 2004/0047453 A1 | 3/2004 | Fraser | |
| 2004/0170258 A1* | 9/2004 | Levin | G10L 15/26 379/88.16 |
| 2005/0135572 A1* | 6/2005 | Da Palma | H04M 3/4938 704/E15.044 |
| 2006/0230410 A1 | 10/2006 | Kurganov et al. | |
| 2006/0282494 A1 | 12/2006 | Sima et al. | |
| 2007/0025535 A1* | 2/2007 | Bushey | H04M 3/42144 379/201.03 |
| 2007/0140466 A1* | 6/2007 | Sharma | H04M 3/493 379/235 |
| 2007/0286360 A1* | 12/2007 | Chu | H04M 3/4938 379/88.01 |
| 2007/0291905 A1 | 12/2007 | Halliday et al. | |
| 2008/0065974 A1 | 3/2008 | Campbell | |
| 2009/0059897 A1* | 3/2009 | Anantharaman | H04M 3/493 370/352 |
| 2009/0080641 A1* | 3/2009 | Fitzgerald | H04M 3/493 379/265.11 |
| 2009/0112572 A1* | 4/2009 | Thorn | G06F 3/038 704/3 |
| 2009/0167553 A1* | 7/2009 | Hong | G06Q 10/06 340/4.61 |
| 2010/0312782 A1* | 12/2010 | Li | G06F 16/9038 707/753 |
| 2011/0010382 A1* | 1/2011 | D'Arcy | H04M 3/5166 707/769 |
| 2011/0075818 A1* | 3/2011 | Vance | G10L 15/22 704/235 |
| 2011/0145641 A1 | 6/2011 | Evans | |
| 2011/0249811 A1* | 10/2011 | Conway | G10L 15/1822 704/E11.001 |
| 2011/0286586 A1* | 11/2011 | Saylor | H04M 1/72436 379/88.13 |
| 2012/0136883 A1 | 5/2012 | Kwabi | |
| 2013/0077772 A1* | 3/2013 | Lichorowic | G06Q 40/08 379/88.01 |
| 2013/0156165 A1* | 6/2013 | Springer | H04M 3/493 379/88.01 |
| 2013/0336465 A1* | 12/2013 | Dheap | H04M 3/5166 379/88.01 |
| 2014/0029733 A1* | 1/2014 | Smith | G10L 15/00 704/E15.001 |
| 2014/0079195 A1* | 3/2014 | Srivastava | G10L 15/22 379/88.01 |
| 2014/0247926 A1* | 9/2014 | Gainsboro | G10L 15/26 379/88.01 |
| 2014/0254776 A1* | 9/2014 | O'Connor | H04M 3/5175 379/265.06 |
| 2014/0314225 A1 | 10/2014 | Riahi et al. | |
| 2014/0334614 A1* | 11/2014 | Mezhibovsky | H04M 3/4936 379/88.01 |
| 2015/0095305 A1 | 4/2015 | Tripp | |
| 2015/0103984 A1* | 4/2015 | Peterson | G10L 15/063 379/88.01 |
| 2015/0235163 A1 | 8/2015 | Gupta | |
| 2015/0237204 A1* | 8/2015 | Beals | H04M 3/5166 379/88.01 |

(56) References Cited

U.S. PATENT DOCUMENTS

| | | | |
|---|---|---|---|
| 2015/0281450 A1* | 10/2015 | Shapiro | H04M 3/5166 |
| | | | 379/265.09 |
| 2016/0062876 A1 | 3/2016 | Narayanan | |
| 2016/0065637 A1 | 3/2016 | O'Malley | |
| 2016/0086225 A1 | 3/2016 | Liu et al. | |
| 2016/0105565 A1* | 4/2016 | Conway | H04M 3/5232 |
| | | | 379/88.01 |
| 2016/0227034 A1* | 8/2016 | Kulkarni | H04M 3/24 |
| 2017/0293610 A1 | 10/2017 | Tran | |
| 2018/0139324 A1* | 5/2018 | Pearce | G06Q 30/01 |
| 2018/0146090 A1 | 5/2018 | Lavian et al. | |
| 2019/0320067 A1* | 10/2019 | Pearce | H04M 3/493 |
| 2021/0092229 A1* | 3/2021 | Willshire | H04M 3/24 |
| 2022/0407961 A1* | 12/2022 | Willshire | H04M 7/1295 |
| 2023/0026071 A1* | 1/2023 | Willshire | G10L 15/22 |

\* cited by examiner

SYSTEM AND METHODS FOR AUTOMATED CUSTOMER RESPONSE SYSTEM MAPPING AND DUPLICATION

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/985,652
Ser. No. 16/379,084
Ser. No. 15/091,556
Ser. No. 14/590,972

BACKGROUND OF THE INVENTION

Field of the Art

The disclosure relates to the field of contact center technology, more specifically to the field of mapping and duplicating contact center automated communications.

Discussion of the State of the Art

When creating a new customer response system, a large amount of work is necessary to programmatically define the menu and response trees.

What is needed is a system and method for accelerating the process of creating an automated customer response system by remotely mapping an existing system and duplicating that system by automatically generating the code that defines the menu and response trees.

SUMMARY OF THE INVENTION

Accordingly, the inventor has conceived and reduced to practice a system and method for automated customer response system mapping and duplication, comprising a contact center crawler which connects with an existing automated contact center system, may navigate and map that system by recording and selecting each available option or by interfacing with the code that makes up the IVR itself to generate a model, records the response to each selected option, and feeds the options and responses to a tree creator; a CX model generator which organizes the options and responses into a data map such as a tree or more graph-like or map-like structure, where logical conditions or operations such as loops and recursion may be present; and a coding engine that generates programmatic code representing the data model that can be imported into another IVR platform for execution.

The following non-limiting summary of the invention is provided for clarity, and should be construed consistently with embodiments described in the detailed description below.

According to a preferred embodiment, a system for automated customer response system mapping and duplication is disclosed, comprising: a contact center; a datastore; a contact center crawler comprising a first plurality of programming instructions stored in a memory of, and operating on a processor of, a computing device, wherein the first plurality of programming instructions, when operating on the processor, cause the computing device to: establish a digital connection with a contact center; wherein the contact center utilizes an automated customer response system; receive one or more communications from the automated customer response system, the communications comprising menu options; record and store the communications received; navigate through the automated customer response system by automatically selecting one or more of the menu options; traverse the back-end code of an automated customer response system, in cases where back-end access is obtainable; send data comprising the specified queries of the contact center crawler, and the responses from the contact center and automated customer response system, to a tree model generator; a tree model generator comprising a second plurality of programming instructions stored in a memory of, and operating on a processor of, a computing device, wherein the second plurality of programming instructions, when operating on the processor, cause the computing device to: map the navigation of the automated customer response system as a data tree; traverse and map the code comprising the automated customer response system, as received from the contact center crawler; record and store the path of the code analyzed as a graph, tree, or map of possible inputs and outputs for an automated response system; and a CX model generator comprising a third plurality of programming instructions stored in a memory of, and operating on a processor of, a computing device, wherein the third plurality of programming instructions, when operating on the processor, cause the computing device to: receive tree model or tree graph data from a tree model generator; wherein the tree model or tree graph data from the tree model generator comprises query and response trees of a contact center's automated customer response system; and convert the data tree or trees into a CX model containing the code needed to recreate such a contact center based on the tree model generated.

According to another preferred embodiment, a method for automated customer response system mapping and duplication is disclosed, comprising the steps of: establishing a digital connection with a contact center, using a contact center crawler; wherein the contact center utilizes an automated customer response system, using a contact center crawler; receiving one or more communications from the automated customer response system, the communications comprising menu options, using a contact center crawler; recording and storing the communications received, using a contact center crawler; navigating through the automated customer response system by automatically selecting one or more of the menu options, using a contact center crawler; traversing the back-end code of an automated customer response system, in cases where back-end access is obtainable, using a contact center crawler; sending data comprising the specified queries of the contact center crawler, and the responses from the contact center and automated customer response system, to a tree model generator, using a contact center crawler; mapping the navigation of the automated customer response system as a data tree, using a tree model generator; traversing and map the code comprising the automated customer response system, as received from the contact center crawler, using a tree model generator; recording and storing the path of the code analyzed as a graph, tree, or map of possible inputs and outputs for an automated response system, using a tree model generator; receiving tree model or tree graph data from a tree model generator, using a CX model generator; wherein the tree model or tree graph data from the tree model generator comprises query and response trees of a contact center's automated customer response system, using a CX model generator; and converting the data tree or trees into a CX model containing the code needed to recreate such a contact center based on the tree model generated, using a CX model generator.

According to an aspect of an embodiment, an automated speech recognition module is used to: receive communications in audio form from the contact center crawler; convert the audio communications to text; and send the text to the contact center crawler.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
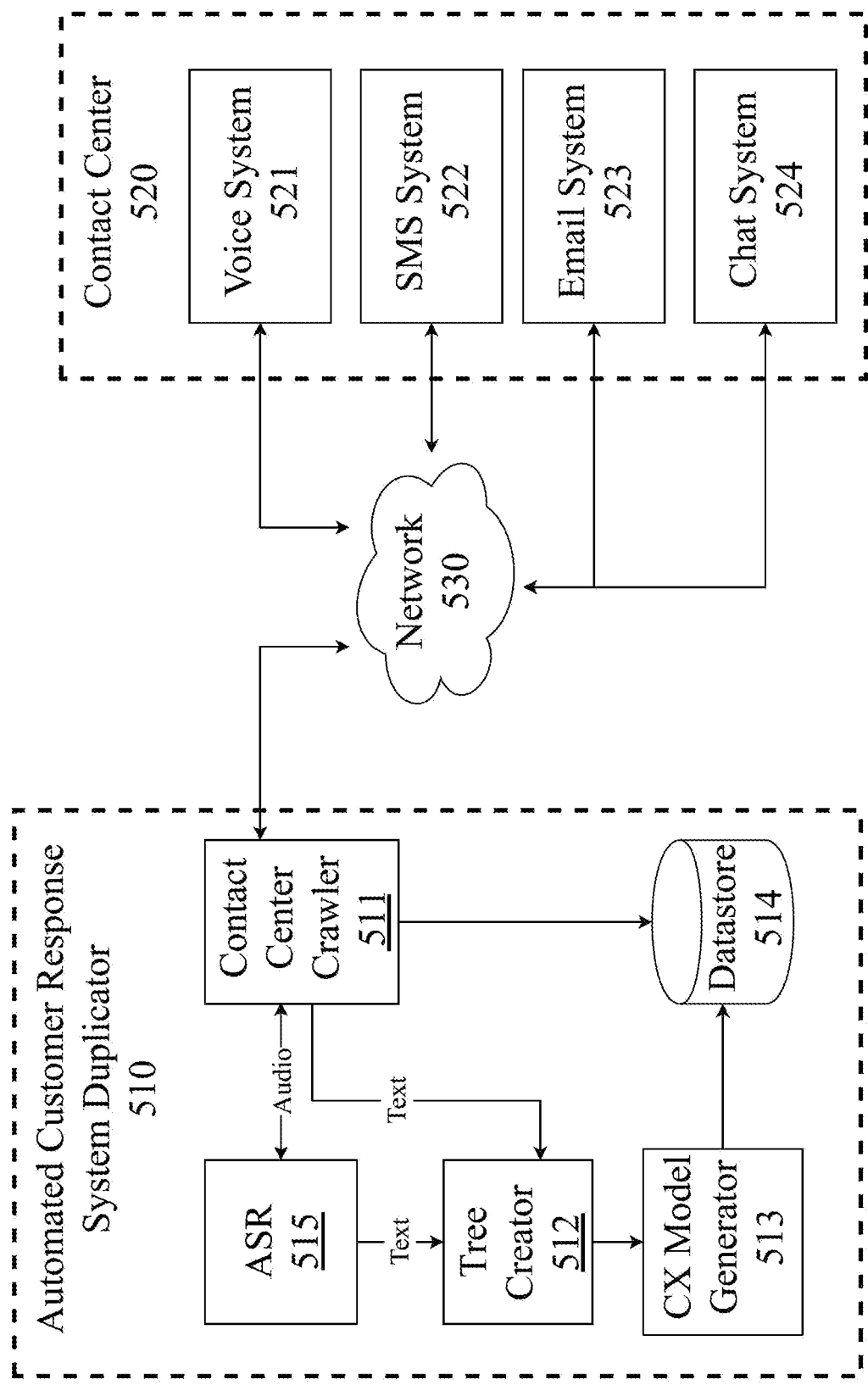
FIG. 1 is a system diagram illustrating an exemplary architecture for an automated customer response mapping and duplication system external to a contact center.

The inventor has conceived, and reduced to practice, a system and method for automated customer response system mapping and duplication, comprising a contact center crawler which connects with an existing automated contact center system, navigates and maps that system by recording and selecting each available option, records the response to each selected option, and feeds the options and responses to a tree creator; an automated speech recognition engine, which converts the recordings into text; a tree creator which organizes the options and responses into a data tree; and a coding engine that generates programmatic code representing the data tree.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a system diagram illustrating an exemplary architecture for an automated customer response mapping and duplication system external to a contact center. A contact center code translator 510 is a computer system containing several software components and able to communicate over a network 530 with components of a contact center's automated customer response system. For audio communications, the connection may be made over a public switched telephone network (PSTN) system or voice over Internet protocol (VOIP) connection. Certain text-based communications such as email and chat may be made using an Internet connection, while other text-based communications such as short message service (SMS) texts made be made through a mobile phone connection. Software components inside of a contact center code translator 510 include a contact center crawler 511, a tree creator 512, a CX model generator 513, a datastore 514, and an automated speech recognition (ASR) engine 515. A contact center crawler 511 may connect to a contact center's 520 automated communications such as interactive voice response (IVR) system 521, and may also crawl and interact with a contact center's SMS system 522 if applicable, email system 523 if applicable, and online text chat system 524 if applicable. A contact center crawler 511 interacts with these services using appropriate Application Programming Interface (API) or other network communications to simulate a customer contact with the system and recognize and select every option presented by the automate customer response system, many of which follow similar structures but have different content or depths to menus and options, which may be crawled by the system. For audio communications, the contact center crawler 511 records the audio (i.e. voice prompts) in a database 514 simultaneously passes the audio to an automated speech recognition (ASR) system 515, which converts the audio into text and passes the text back to the contact center crawler 511 for interaction with the IVR system 521. As the contact center crawler 511 selects options, responses received from the IVR 521 for each option selected are recorded in the database 514 and sent to the ASR 515 for conversion into text, which is then passed to the tree creator 512. For text-based automated customer response systems 522, 523, 524, the ASR 515 is not required, and the contact center crawler 511 can directly select options based on the text and pass text responses received to the tree creator 512 for processing (while also simultaneously storing the options and responses in the database 514). During the crawl of the contact center 520, a tree creator 512 is fed the data for what options led to further options, their relationships, and the responses received, and the necessary steps and selections required for each branch of the automated customer response system tree, building a tree data structure of the automated communications with the contact center 520. The data structure is then fed into a CX model generator 513 which generates programmatic code representing the tree in a data model format such as a textual representation of data such as but not limited to a JavaScript Object Notation (JSON) string or other data graph or tree or map models, before storing in a datastore 514. Many methods for converting data structures to various object and graph model formats are known to the art, and "toModel" or similar methods in Object Oriented Programming (OOP) are quite common, relying on the interpretation of nested or tree data and formatting it with brackets so as to make it both easily parsed by computers and humans alike. The system as shown may be capable of both "crawling" the responses of a voice system with automated voice recognition, and with separately extracting received data and forming abstract models in the form of data objects, maps, graphs, database entries, or other forms of data storage and structure, for the purposes of representing the crawled voice system as a model of an IVR system.

Figure 2:
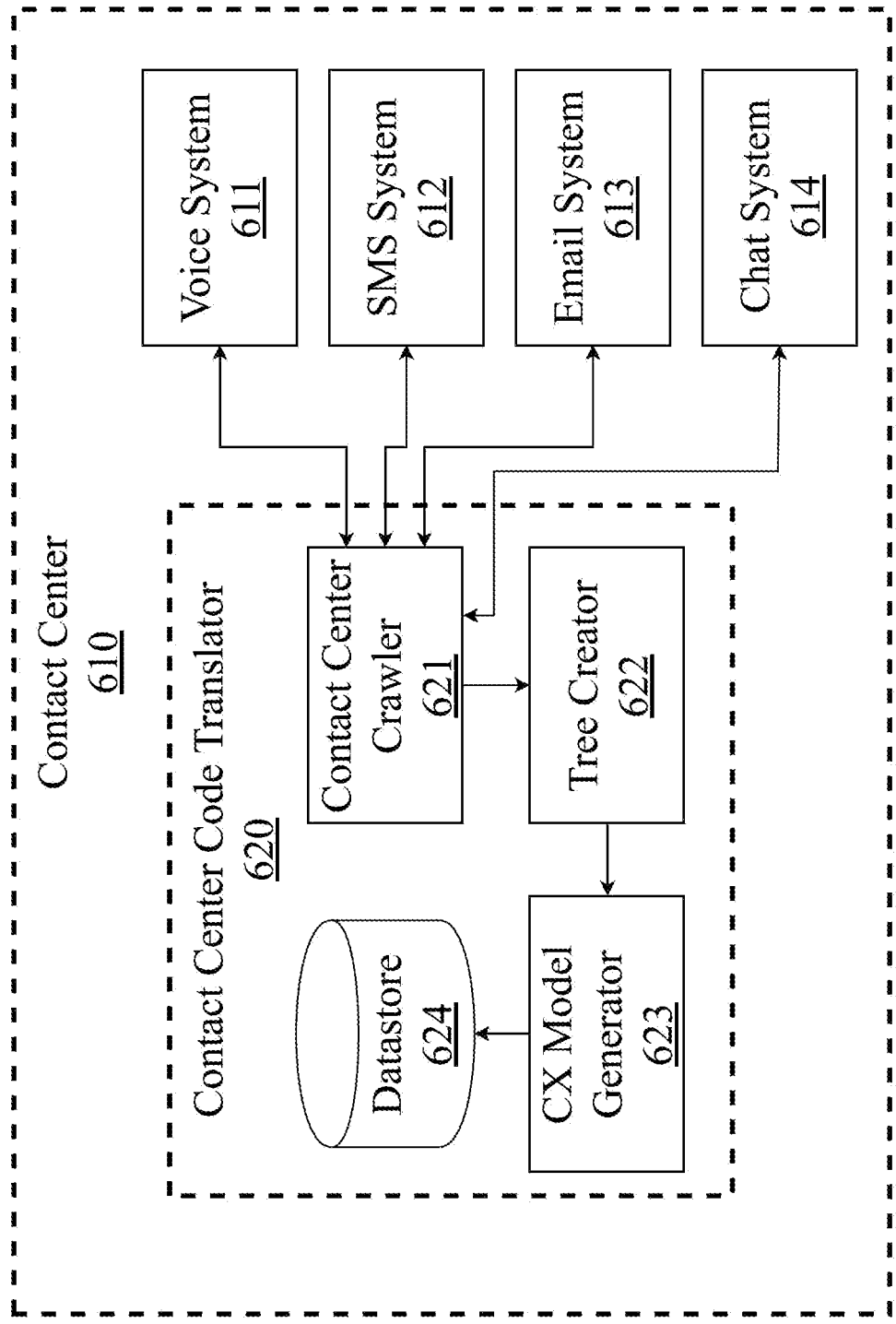
FIG. 2 is another system diagram illustrating an exemplary system for automated customer response mapping and duplication internal to a contact center.

FIG. 2 is another system diagram illustrating an exemplary system for automated customer response mapping and duplication internal to a contact center. In this embodiment, the system does not require external network connections, and can interact directly with the automated customer response systems 611-614. A contact center code translator 620 is, in an exemplary embodiment, a computer system containing several software elements and able to communicate internally with a contact center 610 and the automated communication systems inside the contact center. Software components inside of a contact center code translator 620 include a contact center crawler 621, a tree creator 622, a CX model generator 623, and a datastore 624. A contact center crawler 621 may connect to a contact center's 610 automated communications such as Automated customer Response (IVR) system 611, and may also crawl and interact with a contact center's SMS system 612 if applicable, email system 613 if applicable, and online text chat system 614 if applicable. A contact center crawler 621 interacts with these services using appropriate Application Programming Interface (API) or other network communications such as a Local Area Network (LAN) or Wide Area Network (WAN) to simulate a custom and go through every option available in their automated communications, especially an IVR 611, many of which follow similar structures but have different content or depths to menus and options, which may be crawled by the system. During the crawl of the contact center 610, a tree creator 622 is fed the data for what options led to further options and their relationships, terminating nodes, and the necessary steps and syntax to get to each node discovered, building a tree data structure of the automated communications with the contact center 610. The data structure is then fed into a CX model generator 623 which formats the tree or other graph of options in a compatible data model format, such as being converted automatically by a data parser or object converter available in many object oriented programming languages, before storing in a datastore 624. Many methods for converting data structures to specified object formats such as graphs or trees are known to the art, and "toObject" or similar methods in Object Oriented Programming (OOP) are quite common, relying on the interpretation of nested or tree data and formatting it with brackets so as to make it both easily parsed by computers and humans alike. Not shown in this diagram is the automated speech recognition (ASR) system shown in the previous diagram, which operates as previously described. The system as shown may be capable of both "crawling" the responses of a voice system with automated voice recognition, and with separately extracting received data and forming abstract models in the form of data objects, maps, graphs, database entries, or other forms of data storage and structure, for the purposes of representing the crawled voice system as a model of an IVR system.

If access to the back-end code of a contact center 610 that provides and makes up the voice, SMS, email, and chat systems 611, 612, 613, 614 is provided to a contact center crawler 621, or crawler 621 is located inside a contact center 610, crawler 621 may instead be configured to crawl and create a CX model for the contact center IVR systems based on the actual code present, rather than probing and mapping responses received.

According to an embodiment, a CX model is a specific type of data model, derived from a tree graph or tree data model, or thought of in another way, a CX model is a subset of tree data or graph models. The nodes and content of a CX model contain specially formatted and designed code with which a customer contact center's automated response system or text-based communication systems may be initialized and rebuilt with the specific tree of queries and responses as outlined in the CX model. The programming language, if any, or formatting of the queries and responses in a proprietary code or format, may be that of a commonly used programming language such as PYTHON™, C#™, JAVA™, or others, or may be a custom-designed format that may be recognized by an automated response system or related system to construct or reconstruct the specified automated response system according to the model.

Figure 3:
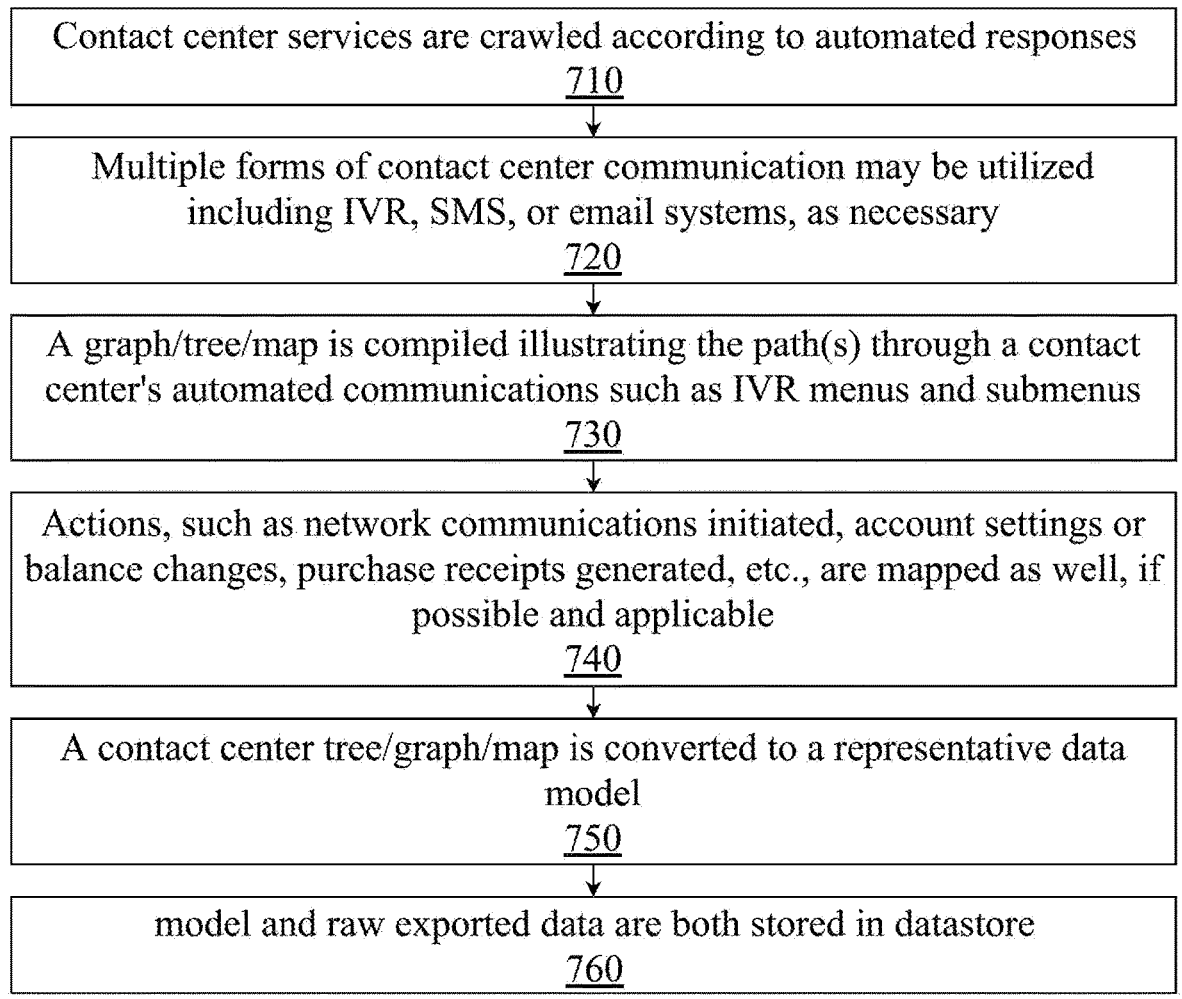
FIG. 3 is a method diagram illustrating steps in a method for automated communications and automated customer response crawling and mapping.

FIG. 3 is a method diagram illustrating steps in a method for automated communications and automated customer response crawling and mapping. First, contact center services are crawled according to automated responses 710, utilizing either a connection over a network such as a PSTN, the Internet, or a LAN or WAN, or even direct connection to contact center components if applicable. In this way, a contact center crawler may either be located on the same hardware or premises as the contact center, or may be located elsewhere and connect across a PSTN or other network. For the purposes of crawling the automatic communications of a contact center 710, multiple forms of contact center communication may be utilized including IVR, SMS, or email systems, as necessary 720, or only one form of communication system such as an IVR may be tested. IVR and SMS systems frequently overlap, for instance an SMS message with a confirmation code or security code for two-factor authentication might be sent to a user while communicating with an IVR. A tree is compiled illustrating the path or paths through a contact center's automated communications such as IVR menus and sub-menus 730 as a result of the crawler, and actions, such as network communications initiated, account settings or balance changes, purchase receipts generated, etc., are mapped as well, if possible and applicable 740. In this way, a tree data-structure is able to be produced, for instance as an object using Object Oriented Programming (OOP), with nodes containing identifying information, syntax for reaching a subsequent node which may be a further branch or a discrete action that returns to another node, and the connections to those further nodes or discrete actions. Such a contact center tree is converted to a data model object 750, the conversion of an abstract data object to a programmatic data object (such as reading a decision tree with a known structure in as a data graph object) being quite common in many software applications in the broad sense, before the model and raw data are both stored in datastore 760. The nature of such a data graph object being more of a structure of relationships and nodes and pathways, rather than raw code or the content in the prompts such as saying to a customer, "welcome to bank ABC," but rather preserving merely that the system prompts a customer in some way on the graph, tree, or map. The flow, structure, or nature of the IVR which may be stored and preserved may include points in the IVR system where the IVR speaks to the customer, points where the customer speaks to the IVR, the method of their interaction such as with voice or with dual-tone multi-frequency signaling (DTMF), and what follows after a given interaction in terms of a next step or a path to take. Exporting such an IVR map, graph, or tree, may be accomplished through export functions supported by the mapping and duplication system, API calls across a network to a cloud-based system or datastore, direct or indirect access to the datastore allowing for the raw data to be polled and utilized, or through other methods of exporting such data structures. The subject or nature of the prompts or discussions or queries in the IVR, in other words the specific use of the IVR that is being crawled and imported as a new data graph object, are unimportant to this system, as the connections and relationships between the paths or nodes are what is being modeled for possible later duplication, not the specific words used by an IVR to communicate with a customer necessarily. Specific subjects, words, prompts, responses, and other content, may be specified when exporting an IVR model to another contact center, if such content is not preserved in the model itself, allowing for a similar IVR template to be modularly used for numerous different contact center needs.

Figure 4:
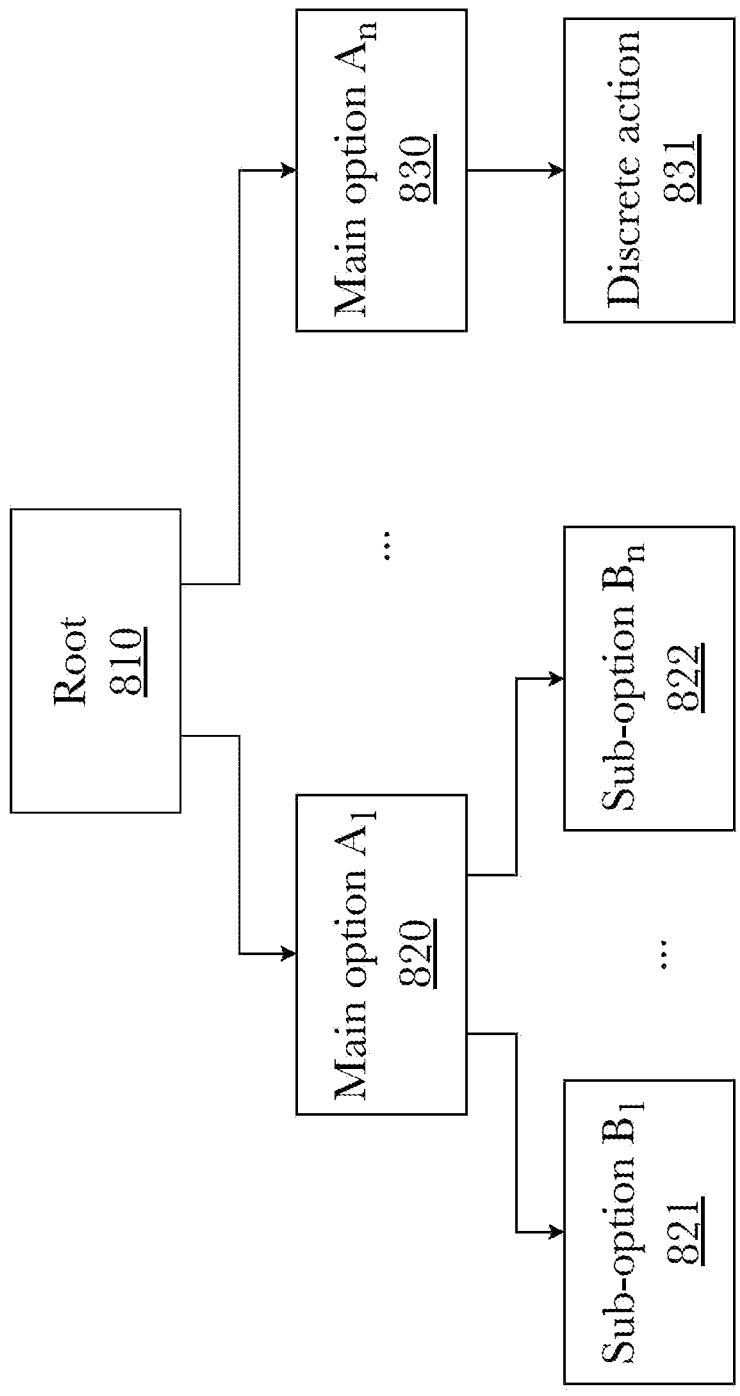
FIG. 4 is a block diagram of an exemplary tree data structure after mapping automated communications from a contact center.

FIG. 4 is a block diagram of an exemplary tree data structure after mapping automated communications from a contact center. A root node 810 exists which may represent the starting point or entry point for an automated communication, such as what is presented to a user who calls a customer service phone number, or the initial text message presented in an automated online chat to a user on a website when they first load up a website or specific webpage. A root node may lead to a plurality of main options $A_1$ through $A_n$ 820, 830, capable of offering any number of further branches from the root node, with each main option being able to offer a plurality of sub-options $B_1$ through $B_n$ 821, 822 or discrete actions which may terminate a tree or loop back to another specified node 831, according to the design of an automated communication.

Figure 5:
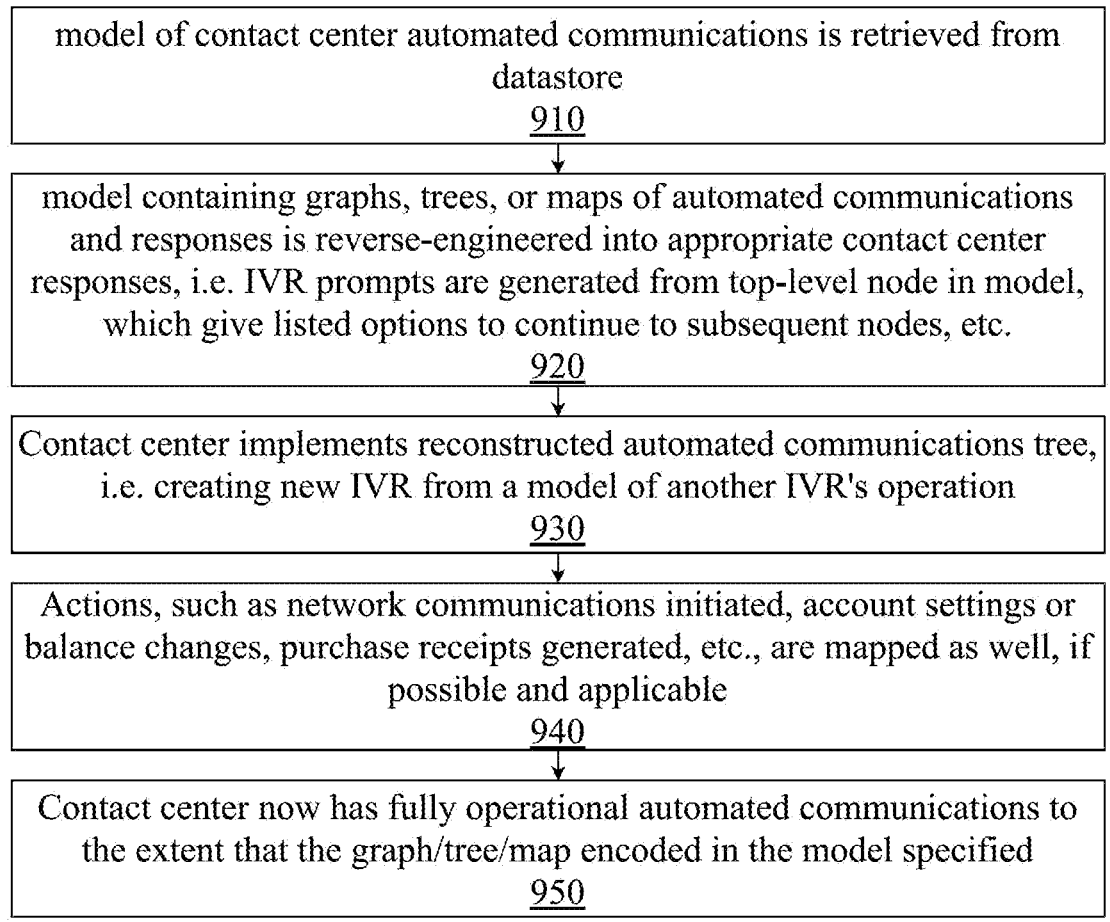
FIG. 5 is a method diagram of utilizing the existing code from one automated customer response system as a template for another such system.

FIG. 5 is a method diagram of utilizing the existing code from one automated customer response system as a template for another such system. With a datastore that possesses code for a model and/or a tree or graph data structure of a contact center's automated communications, as shown in previous figures, a data model object representing the contact center automated communications is retrieved from the datastore 910, wherein the model contains a tree or multiple trees of automated communications and responses, and is reverse-engineered into appropriate contact center responses, i.e. IVR prompts are generated from a top-level node in the model graph, which give listed options to continue to subsequent nodes, etc. 920. A contact center must already possess the infrastructure to support automated communications such as SMS two-factor authentication and an IVR, the specific methods of communications depending on the stored model, allowing the stored model to be parsed and interpreted to represent the syntax and flow of the automated communications. A contact center may then implement reconstructed automated communications tree, i.e. creating new IVR from a model code of another IVR's operation 930 for example. Discrete actions, such as network communications initiated, account settings or balance changes, purchase receipts generated, etc., are mapped as well, if possible and applicable 940, the relevant code or syntax being stored in the model and being re-introduced to a contact center's automated communications, allowing a contact center to now have fully operational automated communications to the extent that the tree encoded in model specified 950. In this way, a contact center's automated communications such as automated email responses, IVR systems, or others, may be encoded from one contact center, and then utilized to create the same automated communications at another contact center, also allowing editing of the communications data.

According to an alternative embodiment, a similar method may be used wherein a model for an IVR system is mapped by obtaining back-end access to the code that makes up the IVR of a contact center, rather than retrieving the data from a datastore or analyzing responses from an IVR directly through customer-like communications testing. In this embodiment the IVR may be mapped programmatically by, for instance, generating an object that represents the variables and methods and their exit-points (and where they exit) in the IVR, if the IVR were generated in an object oriented programming language such as JAVA™ or C#™. This new model may then be stored in a datastore and may be used as a template for other IVR's to model themselves off of.

A stored or extracted data model of a previously existing (or still-existing, as the case may be) IVR system may be turned into new IVR code via configuration of the mapping and duplication system to work with a new IVR system's particular coding paradigm. In other words, configuration of the mapping and duplication system may be specified such that a new IVR may be generated with the model in one of several possible coding paradigms for a contact center, such as C#™ code, JAVA™ code, JAVASCRIPT™ code, a markup file or system, or other forms of expressing IVR code.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
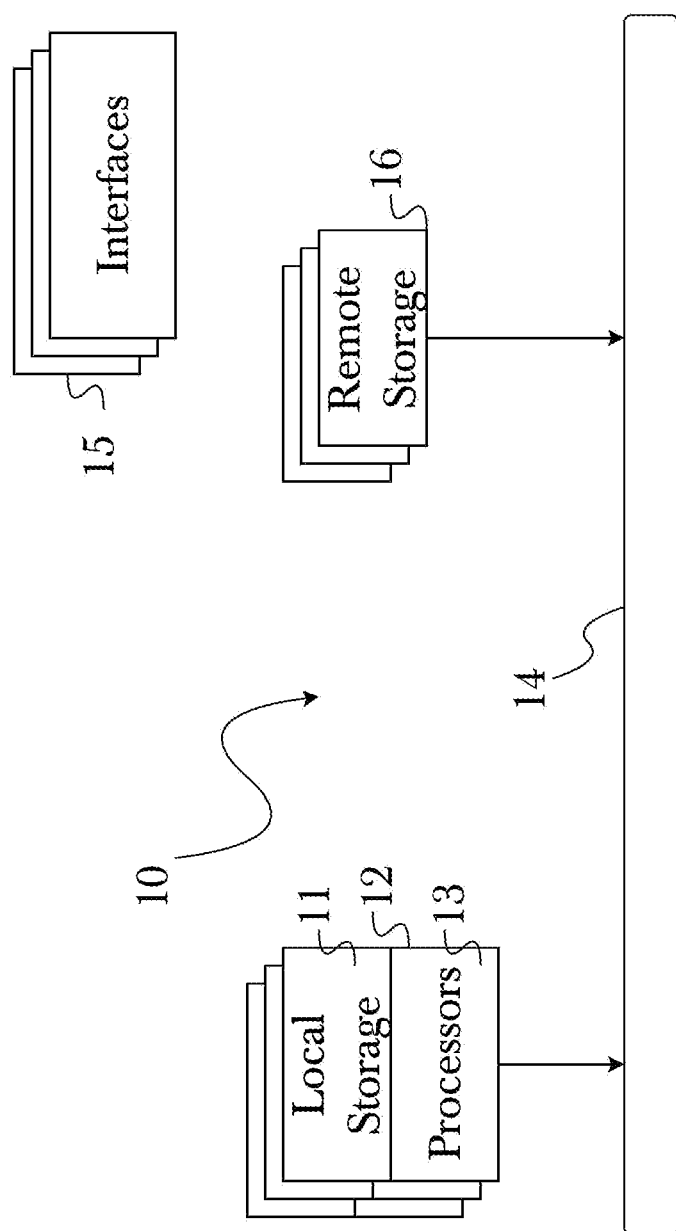
FIG. 6 is a block diagram illustrating an exemplary hardware architecture of a computing device.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
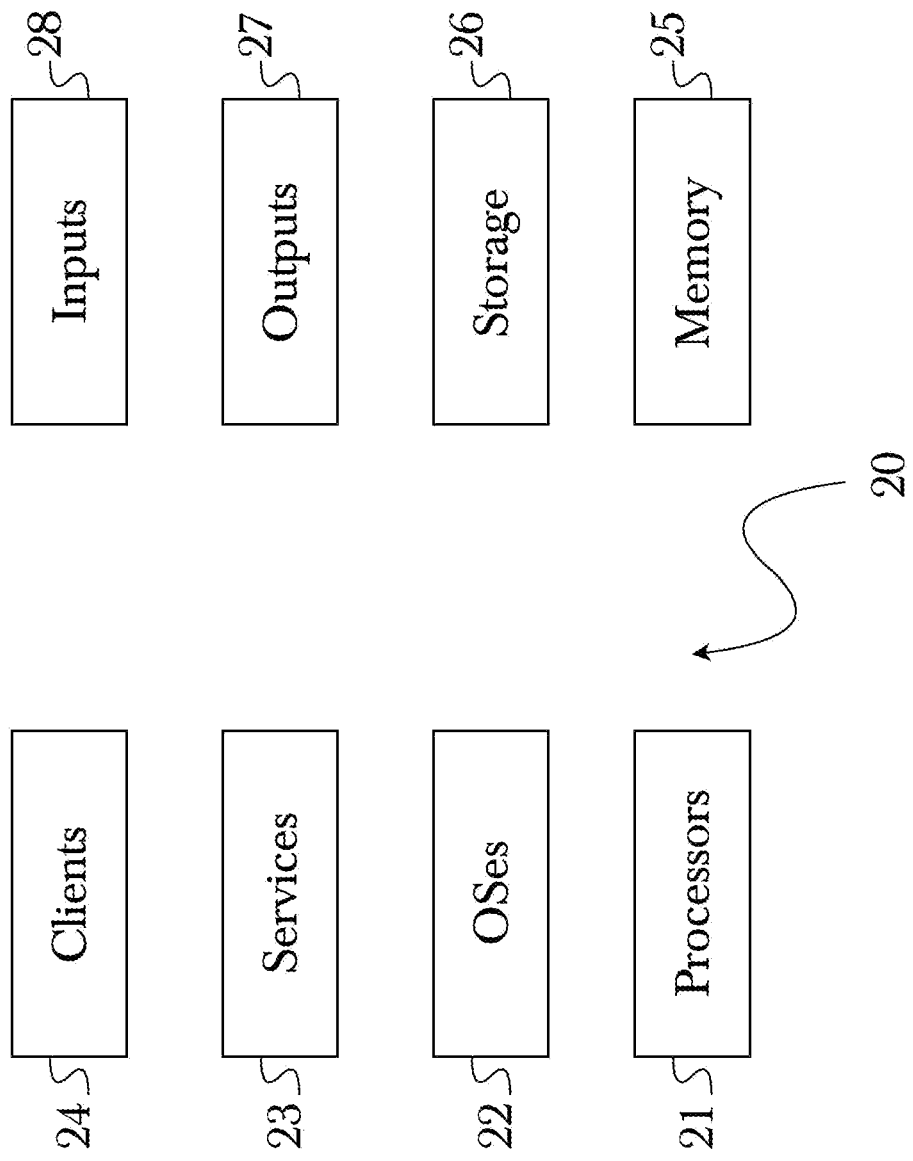
FIG. 7 is a block diagram illustrating an exemplary logical architecture for a client device.

In some embodiments, systems according to the present invention may be implemented on a standalone computing system. Referring now to FIG. 7, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
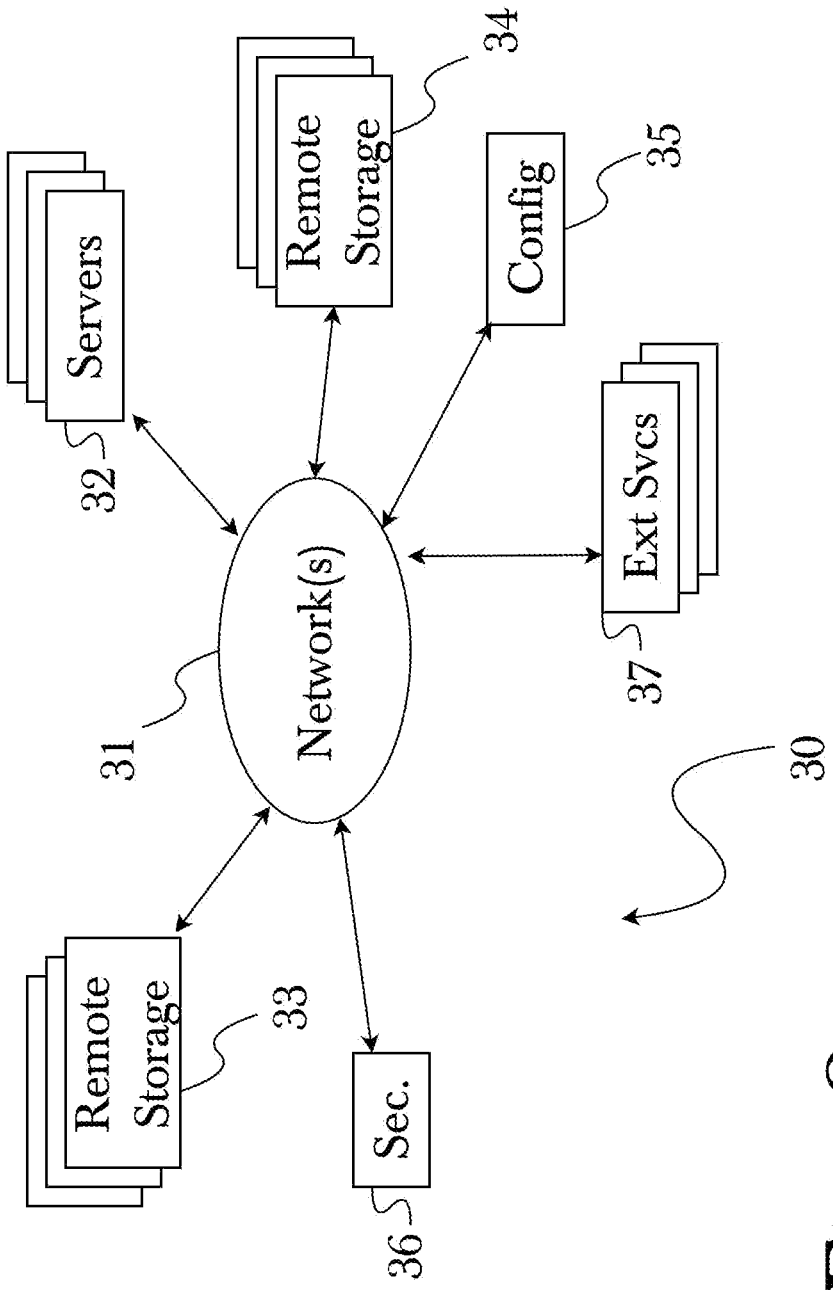
FIG. 8 is a block diagram showing an exemplary architectural arrangement of clients, servers, and external services.

In some embodiments, systems of the present invention may be implemented on a distributed computing network, such as one having any number of clients and/or servers. Referring now to FIG. 8, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 9:
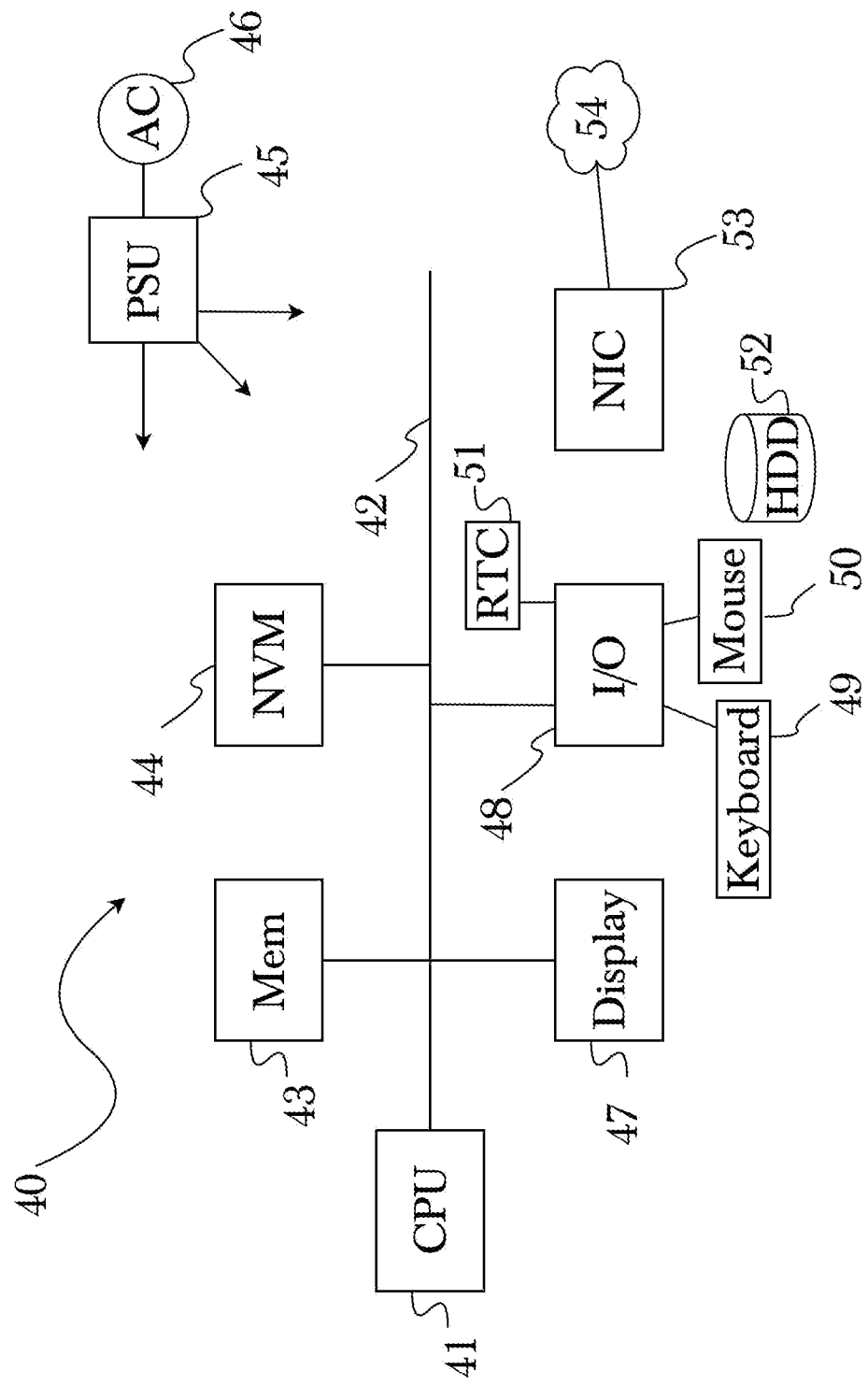
FIG. 9 is another block diagram illustrating an exemplary hardware architecture of a computing device.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for automated customer response system mapping and duplication, comprising:
   a contact center crawler comprising a first plurality of programming instructions stored in a memory of, and operating on a processor of, a computing device, wherein the first plurality of programming instructions, when operating on the processor, cause the computing device to:
establish a connection with a contact center;
wherein the contact center utilizes an automated customer response system;
receive one or more communications from the automated customer response system;
record and store the communications received;
automatically navigate through the automated customer response system;
traverse back-end code of an automated customer response system, in cases where back-end access is obtainable;
send data comprising the specified queries of the contact center crawler, and the responses from the contact center and automated customer response system, to a model generator;
a data model generator comprising a second plurality of programming instructions stored in a memory of, and operating on a processor of, a computing device, wherein the second plurality of programming instructions, when operating on the processor, cause the computing device to:
map the navigation of the automated customer response system;
traverse and map the code comprising the automated customer response system, as received from the contact center crawler;
record and store the path of the code analyzed as a graph, tree, or map of possible inputs and outputs for an automated response system; and
a CX model generator comprising a third plurality of programming instructions stored in a memory of, and operating on a processor of, a computing device, wherein the third plurality of programming instructions, when operating on the processor, cause the computing device to:
receive a data model from a model generator wherein the data model from the model generator comprises query and response models of a contact center's automated customer response system; and
convert the data models into a CX model containing the code needed to recreate such a contact center based on the data model.

2. The system of claim 1, further comprising an automated speech recognition module comprising a fourth plurality of programming instructions stored in the memory of, and operating on the processor of, the computing device, wherein the fourth plurality of programming instructions, when operating on the processor, cause the computing device to:
receive communications in audio form from the contact center crawler;
convert the audio communications to text; and
send the text to the contact center crawler.

3. System of claim 1, wherein the data model is converted into a structured data format for export and import into another platform for the purposes of reproducing the original IVR structure in another system.

4. System of claim 1, wherein the contact center crawler, data model generator, and CX model generator are located on the same systems or an internal network connected to a contact center.

5. A method for automated customer response system mapping and duplication, comprising the steps of:
establishing a connection with a contact center, using a contact center crawler;
wherein the contact center utilizes an automated customer response system, using a contact center crawler;
receiving one or more communications from the automated customer response system, using a contact center crawler;
recording and storing the communications received, using a contact center crawler;
navigating through the automated customer response system, using a contact center crawler;
traversing back-end code of an automated customer response system, in cases where back-end access is obtainable, using a contact center crawler;
sending data comprising the specified queries of the contact center crawler, and the responses from the contact center and automated customer response system, to a data model generator, using a contact center crawler;
mapping the navigation of the automated customer response system using a data model generator;
traversing and mapping the code comprising the automated customer response system, as received from the contact center crawler, using a data model generator;
recording and storing the path of the code analyzed as a graph, tree, or map of possible inputs and outputs for an automated response system, using a data model generator;
receiving a data model from a data model generator, using a CX model generator;
wherein the data model from the data model generator comprises query and response models or maps of a contact center's automated customer response system, using a CX model generator; and
converting the data models into a CX model containing the code needed to recreate such a contact center based on the CX model generated, using a CX model generator.

6. Method of claim 5, further using an automated speech recognition module to perform the following additional steps:
receiving communications in audio form from the contact center crawler;
converting the audio communications to text; and
sending the text to the contact center crawler.

7. Method of claim 5, wherein the data model is converted into a structured data format for export and import into another platform for the purposes of reproducing the original IVR structure in another system.

8. The method of claim 5, wherein the contact center crawler, data model generator, and CX model generator, are located on the same systems or an internal network connected to a contact center.

* * * * *